United States Patent [19]

Thomas

[11] Patent Number: 4,819,360
[45] Date of Patent: Apr. 11, 1989

[54] BOWFISHING ARROWHEAD

[76] Inventor: Larry Thomas, Rte. 2, Box 76, Baxter Springs, Kans. 66713

[21] Appl. No.: 72,515

[22] Filed: Jul. 13, 1987

[51] Int. Cl.⁴ .............................................. A01K 81/04
[52] U.S. Cl. .......................................................... 43/6
[58] Field of Search .................. 43/5, 6; 291/61, 126, 291/127; 273/419, 921

[56] References Cited

U.S. PATENT DOCUMENTS

| | | | |
|---|---|---|---|
| 2,753,643 | 7/1956 | Recker | 43/6 |
| 2,806,317 | 9/1957 | Minisini | 43/6 |
| 2,820,634 | 1/1958 | Vance | 43/6 |
| 2,874,968 | 2/1959 | Zielinski | 43/6 |
| 3,014,305 | 12/1961 | Yurchich | 43/6 |
| 3,036,395 | 5/1962 | Nelson | 43/6 |
| 3,164,385 | 1/1965 | Shure | 273/106.5 |
| 3,320,941 | 5/1967 | Houghton | 43/6 |
| 3,945,642 | 3/1976 | Henthorn | 43/6 |
| 4,685,239 | 8/1987 | La Monica | 43/6 |

FOREIGN PATENT DOCUMENTS

| | | | |
|---|---|---|---|
| 529674 | 6/1955 | Italy | 43/6 |
| 43482 | 4/1920 | Norway | 43/6 |

Primary Examiner—Kurt Rowan
Attorney, Agent, or Firm—Laney, Dougherty, Hessin & Beavers

[57] ABSTRACT

An arrowhead for attachment on an arrow shaft for use in bowfishing. The arrowhead includes a collar portion attachable to the shaft end and a point end that is threadedly received in the collar portion. The point end includes oppositely disposed, pivotally affixed barb vanes that include cam and flat edges for positioning the barb vanes in respective attack and quiver positions, and the barb vanes include a twisted wing tip end portion that functions to provide rotational motion to the arrow during flight.

7 Claims, 1 Drawing Sheet

BOWFISHING ARROWHEAD

BACKGROUND OF THE INVENTION

1. Field of the Invention

The present invention relates to an improved type of arrowhead for bowfishing and, more particularly, but not by way of limitation, it relates to a bowfishing arrowhead having releasable catch blades which function variously to rotate the arrow in flight and to secure the affixure of the arrowhead and shaft in operational attitude.

2. Description of the Prior Art

The prior art includes a number of different types of arrowhead that have been employed for bowfishing. Such arrowheads are primarily concerned with the adjustable presentment of barbs or blades which prevent escape of the fish or other prey after piercing of the flesh, but which may also be readily controlled for easy withdrawal of the arrow shaft or shaft plus arrowhead from the prey. A number of patents of general interest have been discovered and these will be cited upon filing in the Information Disclosure Statement. Among patents of more direct interest are U.S. Pat. No. 3,036,395 which teaches a collapsible barb type of releasing fish point that is controllable in response to rotation of the arrow shaft relative to the arrow point. In this design, the barb extensions are flat blades extending outward from the arrowhead in alar configuration.

Another prior teaching of interest relative to the present invention is U.S. Pat. No. 3,164,385 in the name of Shure which teaches yet another form of arrowhead that includes releasable barbs or vanes. In this case, the vanes are active in their swept back attitude as when the arrow is in flight or has struck; thereafter, the shaft can be twisted to unscrew a locking device within the arrowhead to allow total reversal of the vane device to a forward attitude thereby allowing withdrawal of the arrowhead from the prey. There are a number of different types of arrowhead that provide a barb assembly in one form or another that is controlled as to orientation or spread thereby to allow reverse motion removal of the arrowhead from a target object or prey; however, none of the prior art contemplates the further attribute of in-water arrow revolution to sharpen accuracy.

SUMMARY OF THE INVENTION

The present invention relates to an improved type of arrowhead having releasable barb vanes that also serve to impart rotation to the arrow while maintaining the barb vanes in a locked attack position. More particularly, the arrowhead consists of a point member including an axially aligned threaded post which is engageable in a threaded bore of a collar portion which, in turn, is secured on the forward end of an arrow shaft. Opposite sides of the point each include a pivotally positioned barb vane which is lockable in attack position by full engagement of the collar section, and which barb vanes is each shaped with a quarter turn twist at the outer end to provide aerodynamic reaction to rotate the arrow in water to achieve near perfect accuracy at considerable depths.

Therefore, it is an object of the present invention to provide a bowfishing arrowhead that is true in flight direction and more efficient in retaining the prey.

It is also an object of the invention to provide an arrowhead that is more rugged yet easier to handle in the field.

It is still further an object of the present invention to provide a bowfishing arrowhead including contollable barb vanes that impart a plurality of useful operational functions.

Finally, it is an object of the invention to provide a bow fishing arrowhead wherein the revolutional attitude of the arrow shaft relative to the arrowhead is effective in releasing the barb vanes for removal of the arrow, in locking the barb vanes in attack position, and in locking the barb vanes in reverse position as for quiver storage.

Other objects and advantages of the invention will be evident from the following detailed description when read in conjunction with the accompanying drawings which illustrate the invention.

DETAILED DESCRIPTION OF THE INVENTION

Figure 1:
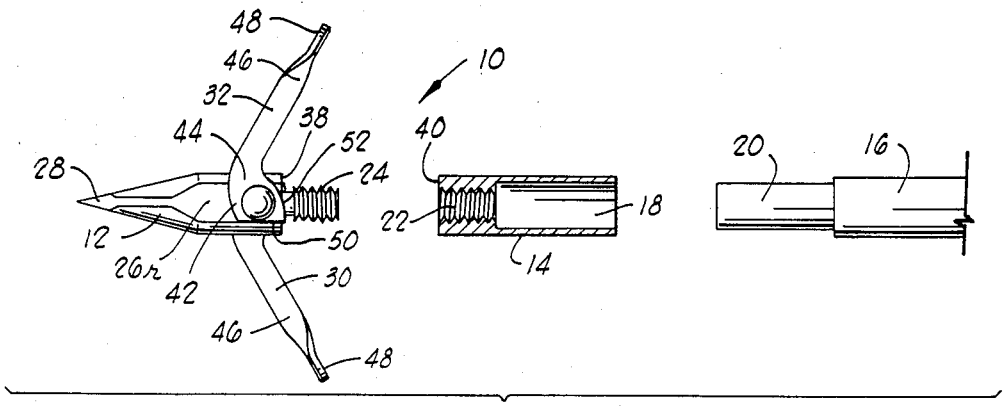
FIG. 1 is an exploded view in side elevation with parts shown in section of an arrowhead constructed in accordance with the present invention.

Referring to FIG. 1, a barbed arrowhead 10 consists of a point 12 that is threadedly engageable with a collar 14 which, in turn, is secured on the tip end of an arrow shaft 16. The collar 14 includes a rearward bore 18 of a size to receive an insert portion 20 of arrow 16 tightly therein to be secured by such as bonding. The collar 14 includes a forward axial threaded bore 22 which contributes to operative control of the arrowhead, and it is important that the arrow insert 20 be securely held within bore 18 without relative rotation therebetween.

The point 12 includes an axial threaded post 24 extending rearward and engageable within threaded bore 22 to fully assemble the arrowhead 10. The opposite side of point 12 is a mirror image of the FIG. 1 view, and opposite sides are formed with opposite flat portions 26-1,r which provide pivotal seating for the barb vanes, as will be described. The forward portion of point 12 is ground to a four corner base pyramid point 28 which when heat treated provides a very sharp and long lasting arrow point, highly effective in piercing scaled surface.

A pair of identically shaped barb vanes 30 and 32 are pivotally mounted on opposite flat sides 26-1,r of point 12 by means of respective pivot pins 34 and 36 (FIG. 3) which are secured as by force or press fitting into the opposite flat portions 26 of point 12 adjacent a rear shoulder 38. Rear shoulder 38 abuts a forward shoulder 40 of collar 14 when the arrowhead is threadedly engaged all the way into the attack position as in FIG. 2. Each of the barb vanes 30 and 32 is shaped identically in what may be termed a crank shape having a foot portion 42 extending through a bend portion 44 to an elongated flat vane portion 46. The respective barb vanes 30 and 32 are pivotally attached through the foot portion 42 whereupon the vane portions 46 sweep rearward and terminate in slightly less than a one-quarter turn twist as a wing tip 48.

Figure 5:
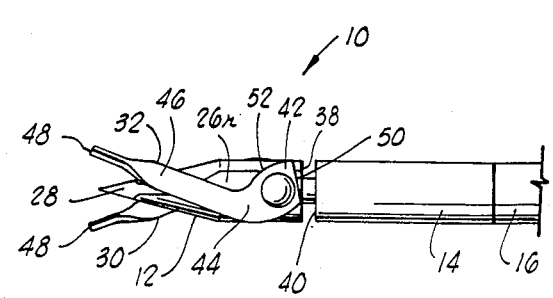
FIG. 5 is a view in side elevation of the arrowhead with barb vanes released to the withdrawal attitude.

Each of the barb vane foot portions 42 includes a lower flat edge 50 which functions to maintain the barb vanes 30, 32 in the quiver or release position as shown in FIG. 5. Thus, after a quarry has been struck and reeled in, the arrow shaft 16 can be rotated about two turns counterclockwise and barb vanes 30 and 32 are released to be drawn all the way forward as the arrow is removed from the prey. Referring again to FIG. 5, if arrow shaft 16 is tightened up or rotated full clockwise, the collar shoulder 40 will abut point shoulder 38 as well as barb vane flat edge 50 thereby to lock against the flat edge 50 and maintain the barb vanes 30 and 32 in what is termed the quiver attitude. That is, arrows can be stored, shuffled and/or withdrawn without damage or danger of entanglement.

Figure 2:
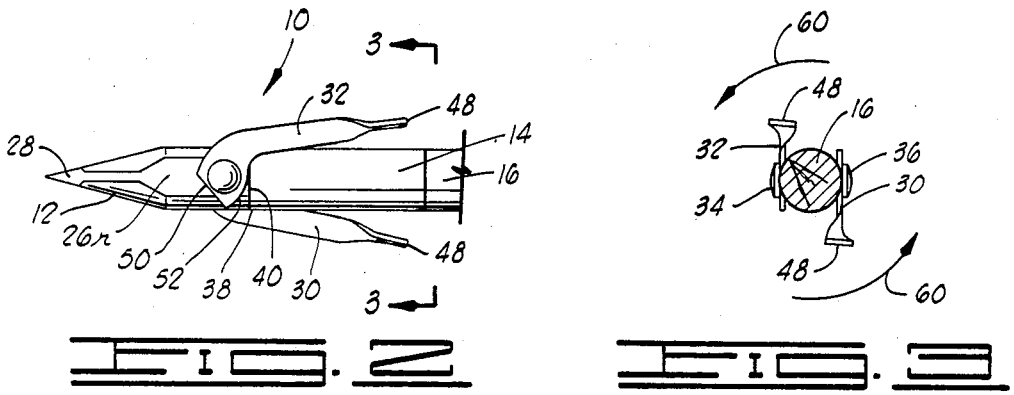
FIG. 2 is a view in side elevation of the arrowhead in attack configuration.
Figure 4:
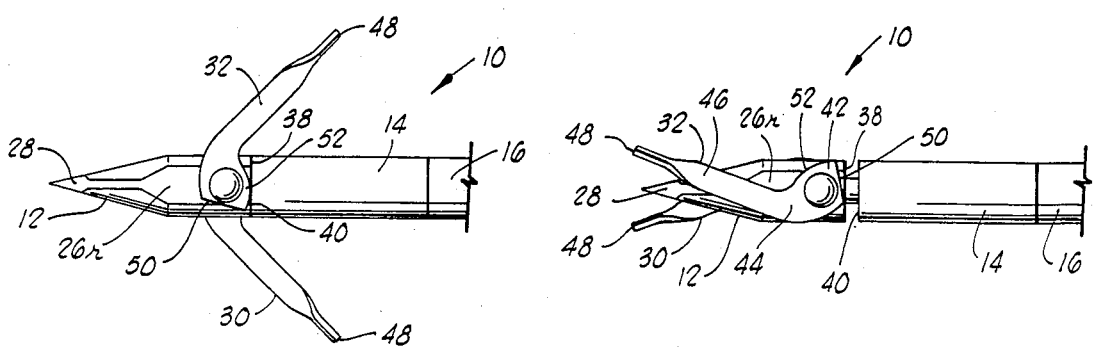
FIG. 4 is a view in side elevation of the arrowhead with barb vanes in retaining position.

Each barb vane 30, 32 also includes a cam edge 52, an arcuate portion formed on the rear edge of each foot portion 42. The cam edge 52 functions to lock against the shoulder 40 of collar 14 when in the attack position with arrow 16 rotated fully clockwise, as shown in FIGS. 2 and 4. FIG. 2 illustrates the attack position when in flight with the barb vanes 30, 32 laid back rearward; however, upon striking the quarry, and with any attempt at withdrawal of the arrow 16, the barb vanes 30 and 32 lock outward into the position of FIG. 4 with arcuate cam edge 52 firmly abutted against shoulder 40 of section 14. Only upon counterclockwise revolutions of arrow 16 will the barb vanes 30 and 32 be released to the forward or withdrawal attitude as shown in FIG. 5.

Figure 3:
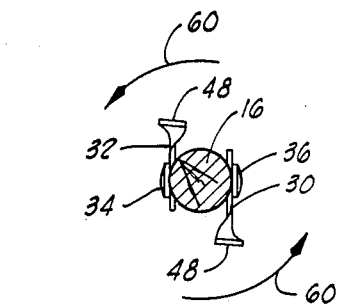
FIG. 3 is a sectional view taken along lines 3—3 of FIG. 2.

Finally, and a most important function of the barb vanes 30 and 32, is the counterclockwise rotation in the water as illustrated by the forward viewing section of FIG. 3. Each of barb vanes 30 and 32 is formed with a twisted wing tip 48 that is twisted slightly less than 90° to provide a predetermined air foil effect. Thus, as the arrow 16 and arrowhead 12 proceed at great speeds through the air or water, passage of fluid material along the sides of the respective barb vanes 30 and 32 causes deflection of wing tip portions 48, as shown by arrows 60, such that arrow 16 sets up a counterclockwise rotation in flight. This has the advantage of not only increasing arrow accuracy and wind resistance but also to maintain a continual tightening tension of arrow point 12 relative to collar 14.

In operation, the arrowhead 10 and arrow 16 may be stored in a conventional quiver with collar 14 unscrewed sufficiently to allow the position as shown in FIG. 5, and then having the collar 14 screwed clockwise to lock collar shoulder 40 against the barb vane flat surfaces 50. As the arrow 16 is withdrawn for use, the collar 14 is screwed counterclockwise and the barb vanes 30 and 32 are moved rearward to the position shown in FIG. 2 whereupon the arrow is secured by rotating collar 14 clockwise until collar shoulder 40 tightly abuts point shoulder 38. The arrow is then ready for firing.

In flight, the arrowhead assembly 10 is maintained in the attitude shown in FIGS. 2 and 3 and the air flow effect of barb vane wing tips 48 tends to set up a counterclockwise rotation of the arrow which also tends to maintain collar 14 in tight abutment to point 12. In traveling through water a strong rotation is imparted and this maintains accurate travel prior to strike. When the arrow strikes the prey, any escape motion of the prey or arrow retracking motion will expand the barbs to the FIG. 4 attitude, wing tips 48 flat to the axial direction, and prevent removal of the arrow. After reeling in or otherwise getting control of the prey, the arrow shaft 16 (and collar 14) can be twisted counterclockwise about two turns, and the arrowhead assembly 10 can be withdrawn as it generally assumes the attitude of FIG. 5. With any pulling motion of barb vanes 30 and 32, the locking cam edges 52 will tend to lock against collar shoulder 40 to prevent the point 12 from loosening.

The foregoing discloses a novel bowfishing arrowhead that exihibits improved characteristics as to accuracy, ruggedness and length of reliable usage. The device includes multi-function barb vanes that serve not only as barbs but also as vanes for imparting desired rotation and as locking devices for maintaining rigid assembly during operation. While the barb vanes function to provide a counterclockwise rotation through air or water when in flight, withdrawal or retraction of the arrow alone will tend to impart a clockwise rotation that serves to untwist any attached line.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

1. An arrow device for bowfishing, comprising:
   an arrow shaft having a front end;
   a collar means secured on said shaft front end and having an axial threaded bore formed therein;
   an arrow point formed as a generally round rear base tapering to a front point and having an axial threaded shaft extending rearward from said rear base to be threadedly received in said threaded bore; and
   first and second barb vanes each having first and second ends with the first ends pivotally affixed on opposite sides of said point section adjacent the rear base, and with the respective second ends similarly formed as a wing tip at a preselected angle relative to the remainder of the barb vane to impart fluid responsive axial rotation to the arrow device during flight;
   whereby said arrow point may be firmly affixed in threaded engagement in said collar means to place the barb vanes in a selected one of the attack position and the quiver position.

2. A device as set forth in claim 1 wherein said arrow point comprises a body of revolution of selected circumfery having two flat surfaces formed on opposite sides of said rear base and lying within the circumfery.

3. A device as set forth in claim 2 wherein said collar means comprises a cylindrical body forming a forward shoulder around said threaded bore for engagement in locking contact with the first ends of said first and second barb vanes when said collar means and arrow point are in firm threaded connection.

4. A device as set forth in claim 3 wherein each of said first ends of said first and second barb vanes includes a cam edge which bears against the collar means forward shoulder tending to prevent relative rotation between said collar means and arrow point when in attack position.

5. A device as set forth in claim 3 wherein each of said first ends of said first and second barb vanes includes a flat edge adjacent said cam edge which bears against the collar means forward shoulder to maintain said barb vanes in a forward direction for storage in the quiver position.

6. A device as set forth in claim 1 wherein each of the second ends is twisted approximately 90° to provide maximum resistance to the point being axially reversed out of the target prey.

7. A device as set forth in claim 1 wherein said front point is formed as a four-corner base pyramid to achieve greater penetration through scale surface.

* * * * *